United States Patent [19]
Peters et al.

[11] Patent Number: 5,171,503
[45] Date of Patent: Dec. 15, 1992

[54] METHOD OF EXTRUDING THIN-WALLED HONEYCOMB STRUCTURES

[75] Inventors: Donald C. Peters, Savona; Richard L. Seely, Horseheads, both of N.Y.

[73] Assignee: Corning Incorporated, Corning, N.Y.

[21] Appl. No.: 743,798

[22] Filed: Aug. 12, 1991

Related U.S. Application Data

[62] Division of Ser. No. 237,983, Aug. 29, 1988, Pat. No. 5,066,215.

[51] Int. Cl.$^5$ .............................................. B29C 47/30
[52] U.S. Cl. ........................... 264/177.11; 264/177.12; 264/211.11
[58] Field of Search ...................... 264/211.11, 177.11, 264/177.12; 425/461, 463, 464, 465, 467, 381, 382 R, 197

[56] References Cited

U.S. PATENT DOCUMENTS

| | | | |
|---|---|---|---|
| 2,392,336 | 1/1946 | Nissen | 425/381 |
| 2,524,829 | 10/1950 | Perzel | 425/465 |
| 3,905,743 | 9/1975 | Bagley | 425/382 R |
| 4,178,145 | 12/1979 | Hamamoto et al. | 425/467 |
| 4,235,583 | 11/1980 | Reed | 425/464 |
| 4,354,820 | 10/1982 | Yamamoto et al. | 264/177.12 |
| 4,373,895 | 2/1983 | Yamamoto et al. | 425/461 |
| 4,465,454 | 8/1984 | Duerr et al. | 425/464 |
| 4,902,216 | 2/1990 | Cunningham et al. | 264/177.12 |

Primary Examiner—Jeffery Thurlow
Attorney, Agent, or Firm—Richard N. Wardell

[57] ABSTRACT

A method of extruding a honeycomb type structures, such as filters, by flow of extrudable material (e.g. ceramic material) through a die with feed holes having smooth and gradual transition of flow cross sectional area and shape to be congruent at end of holes forming junction with intersections of criss crossing discharge slots. In a typical prior art extrusion die, the feed holes are circular in cross section throughout their length and feed into respective intersecting discharge slot portions. There is an abrupt change in cross section area and shape, from circular to cross shaped, at the entrance to the discharge slots. This construction results in flow inhibiting land portions at the entrance to the discharge slot portions. Such a construction causes bending forces or moments on these flow obstructing entrance portions of the discharge slots and also subjects them to increased abrasive wear whenever the material being extruded contains ceramic or other hard particles. By this invention, the feed holes are uniformly tapered from an annular or polygonal transverse cross section at their input ends to a (conventional) cross shape at their outlet ends where they feed the discharge slots. Thus, the bending problems are eliminated and the wear problem is substantially reduced and die life is considerably extended.

6 Claims, 11 Drawing Sheets

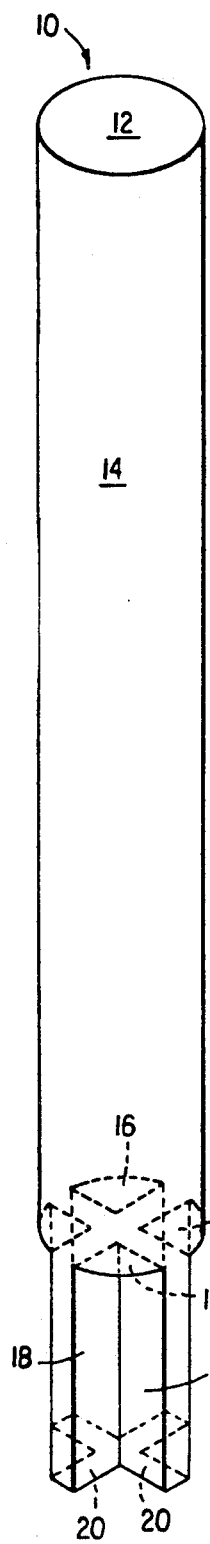
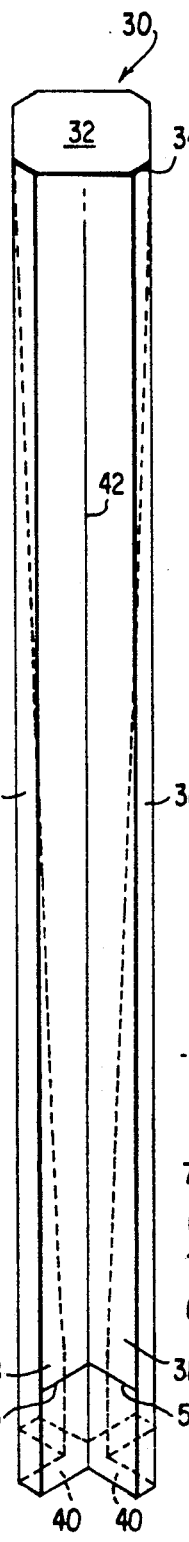
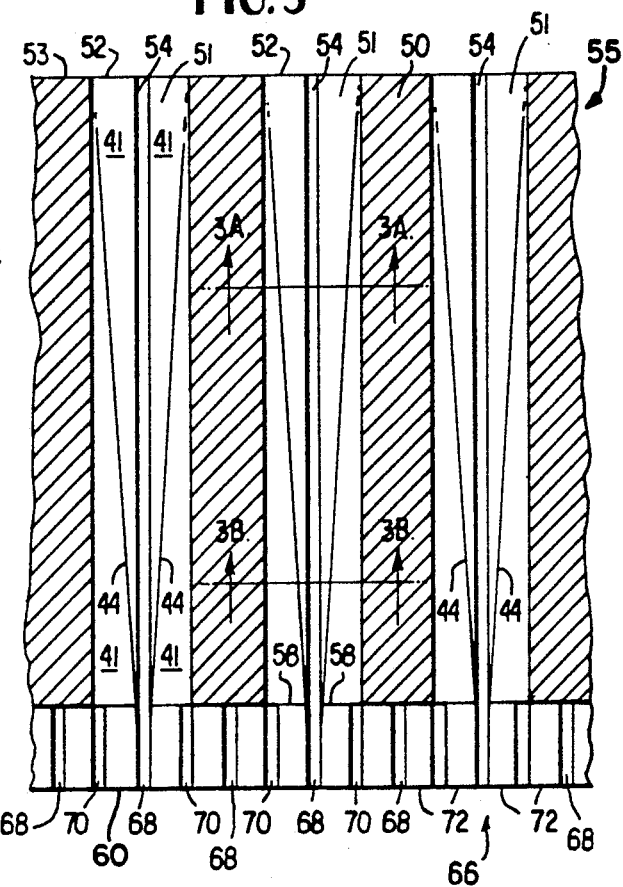
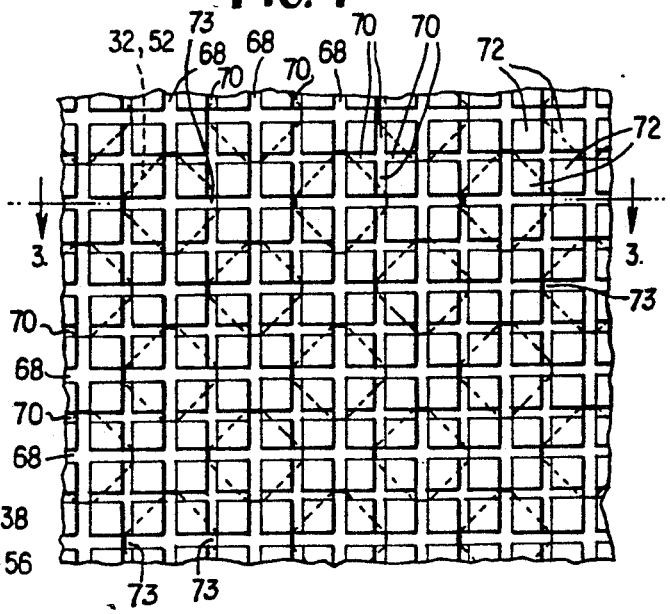

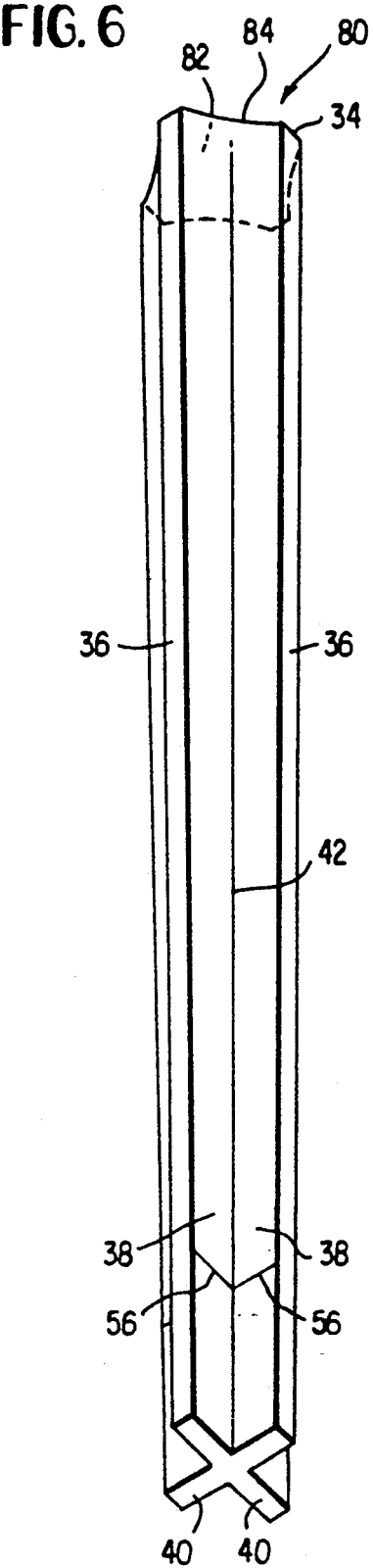
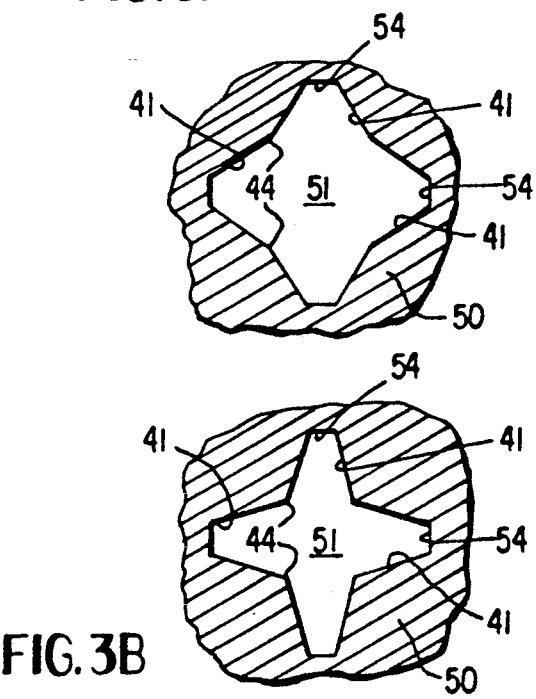
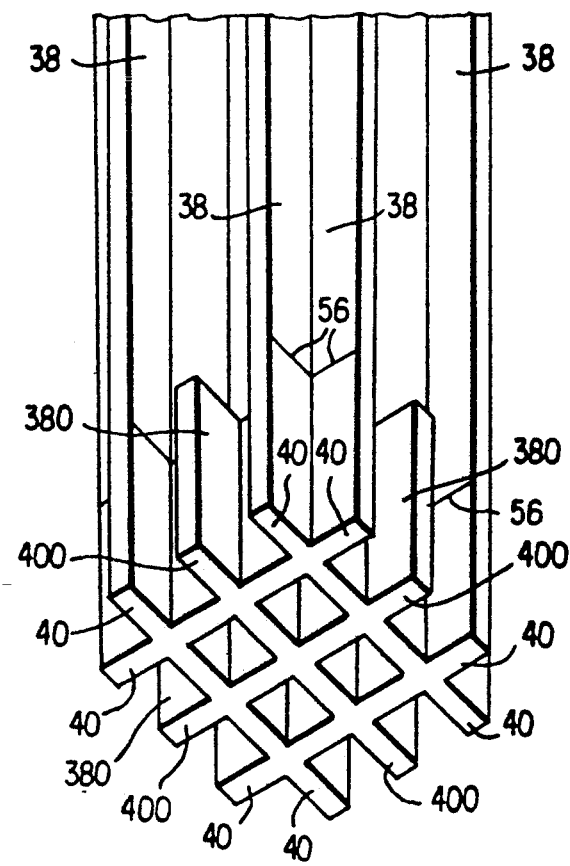

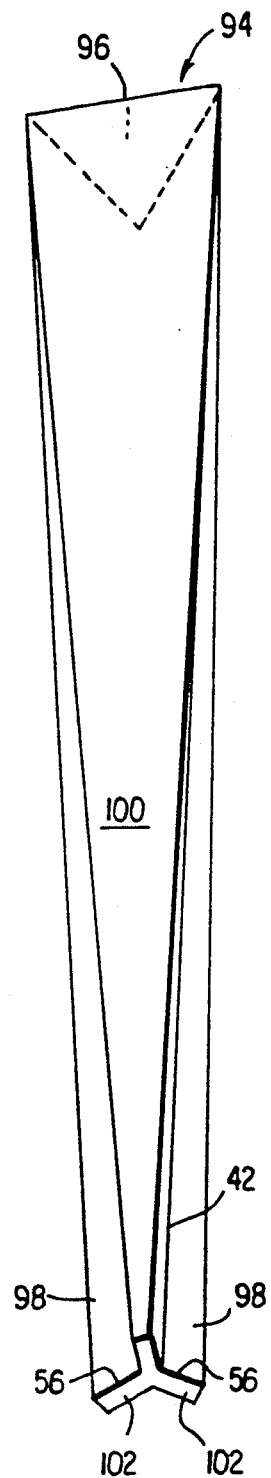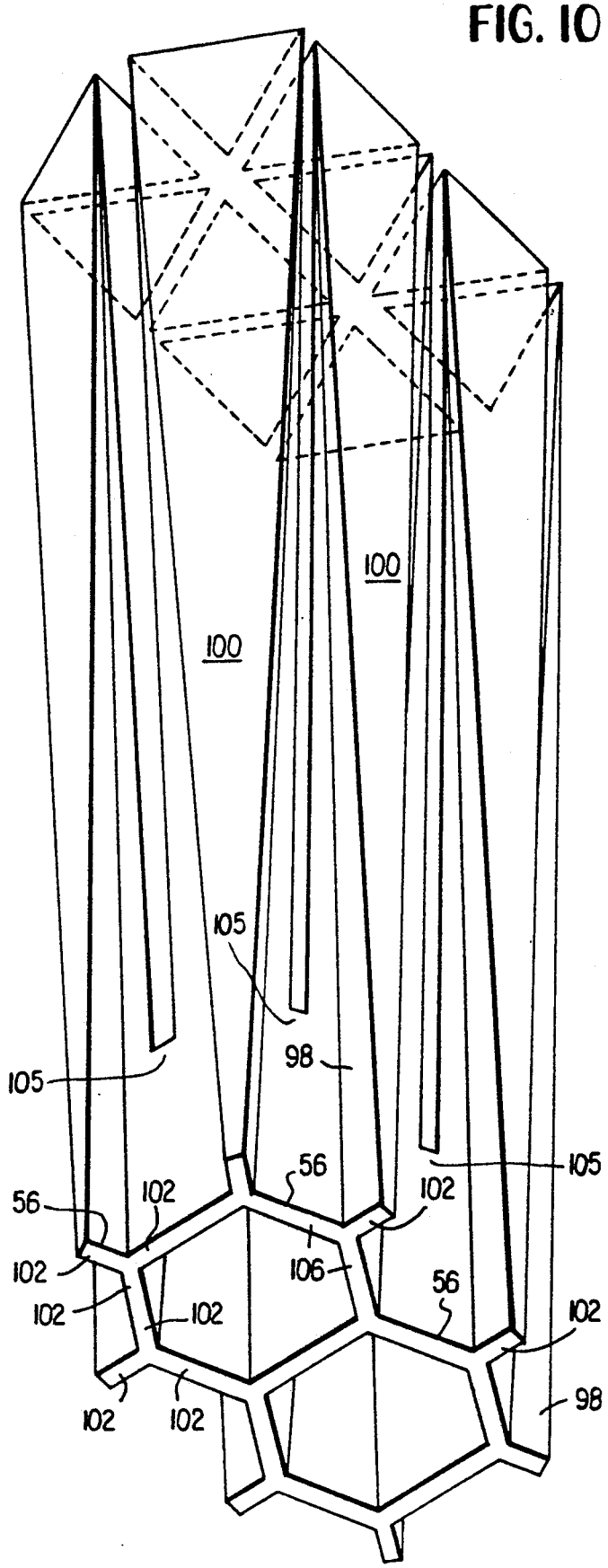

FIG. 12
FIG. 13
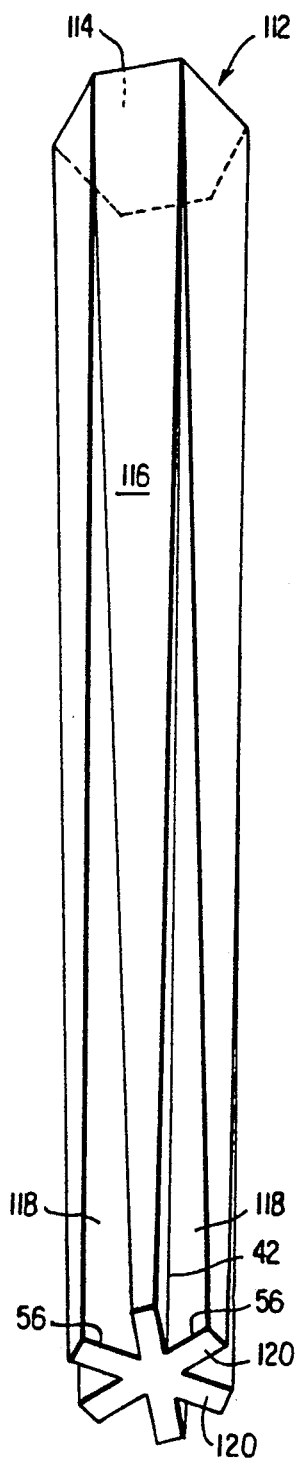
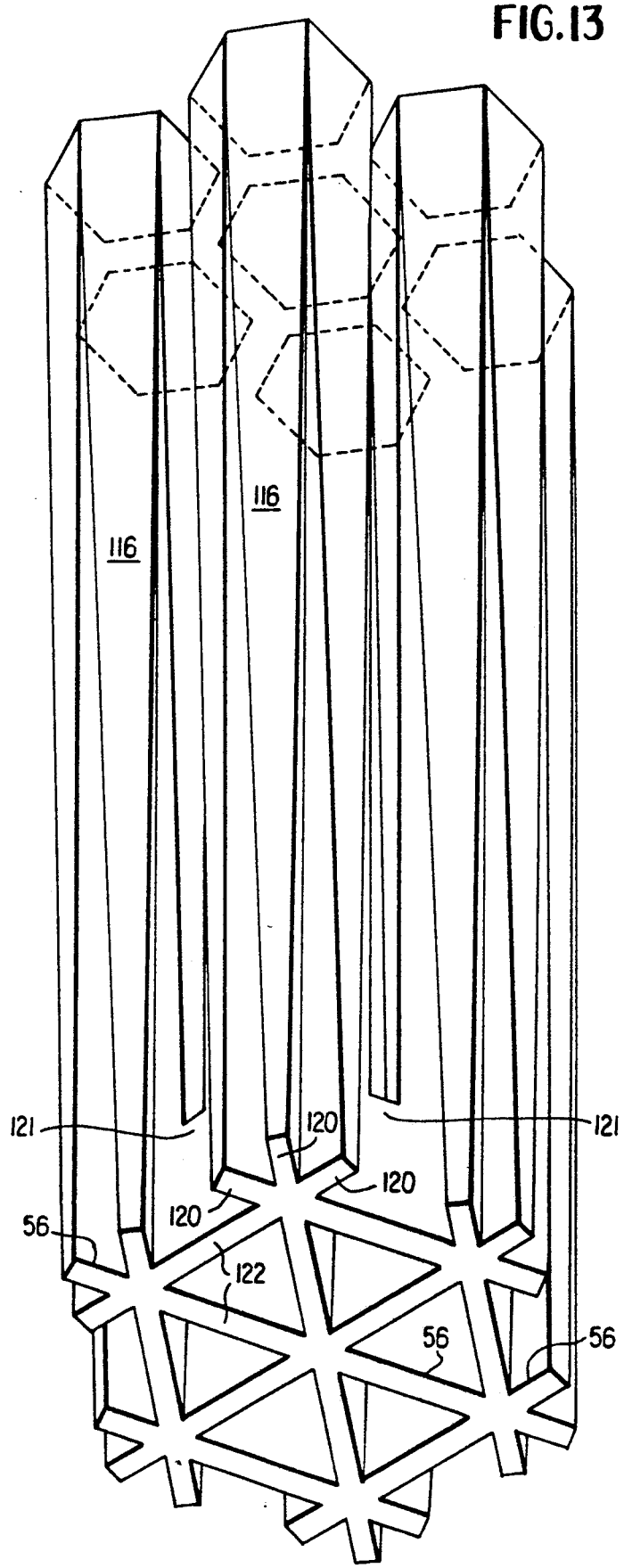

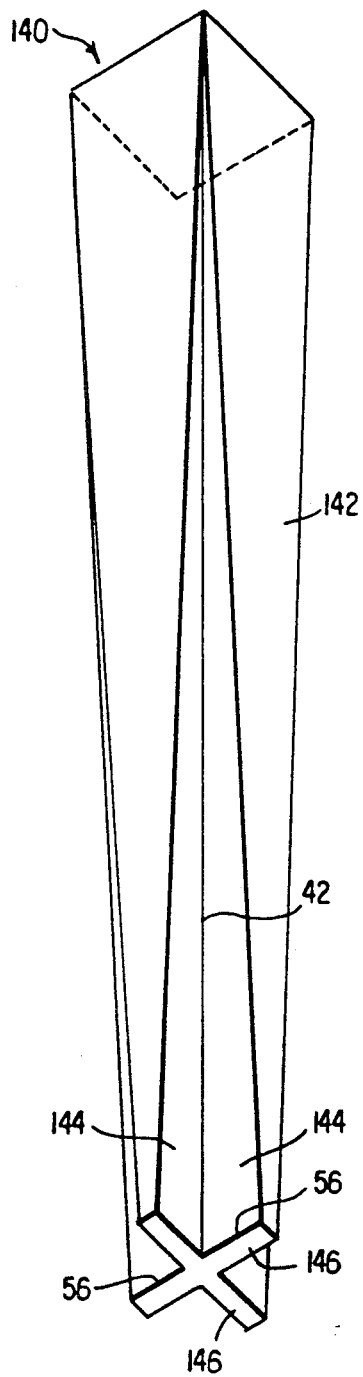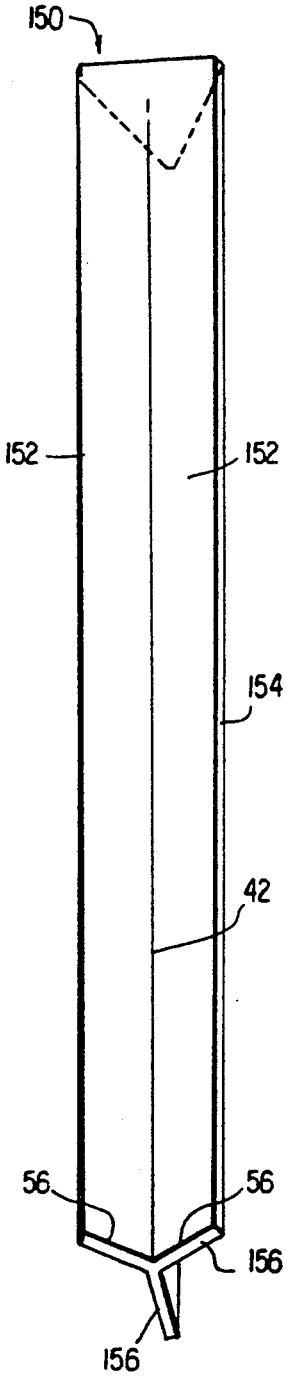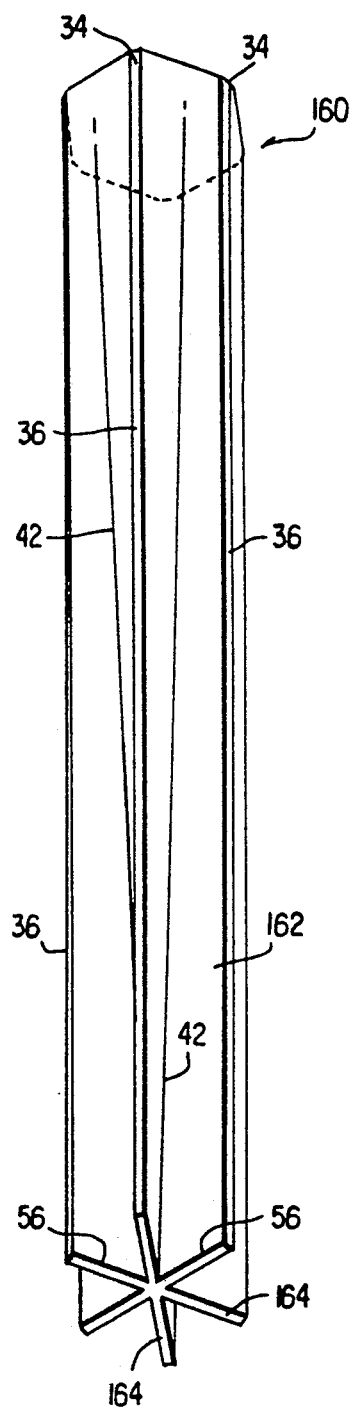

FIG. 18
FIG. 19
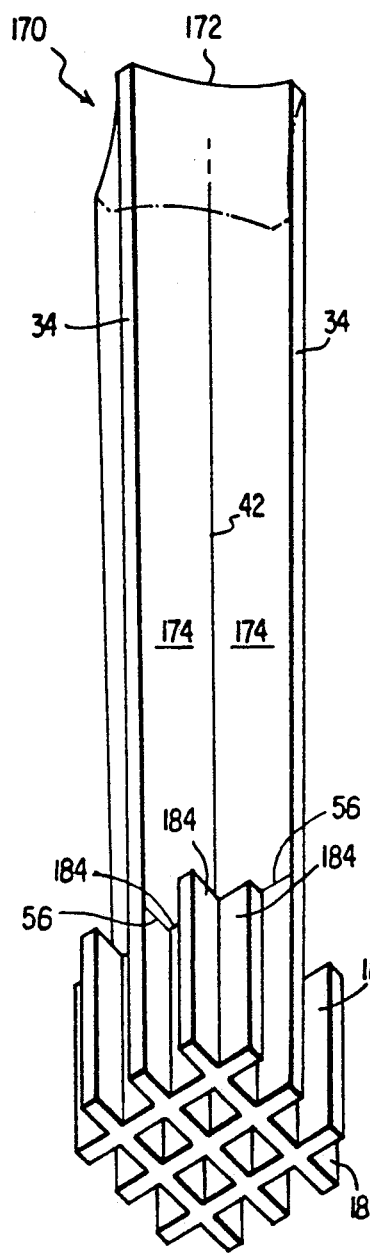
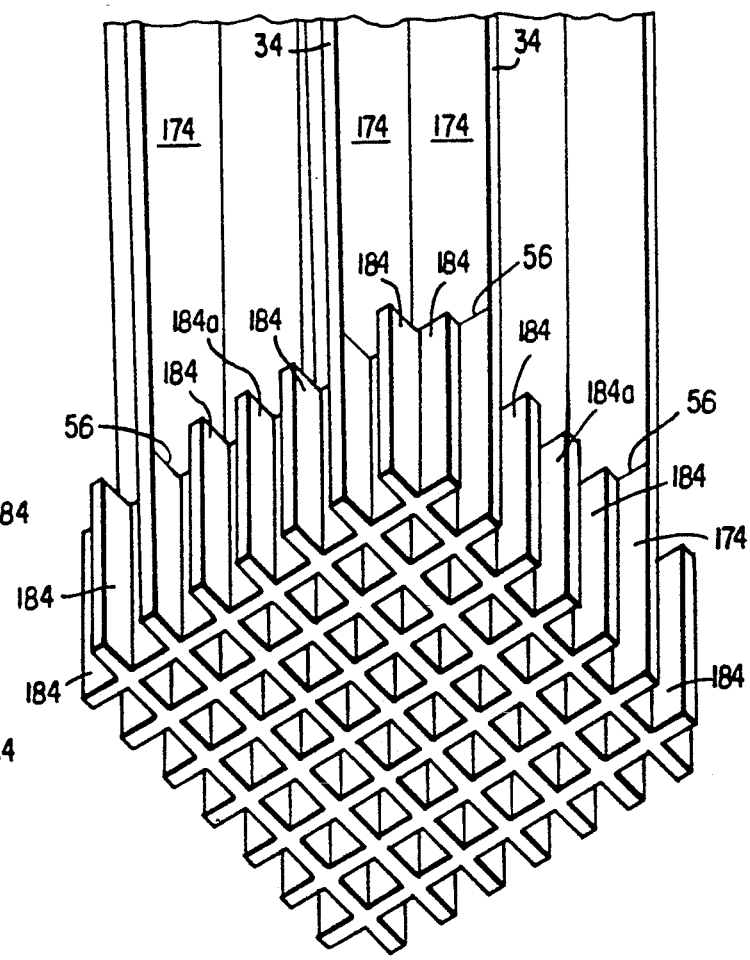

METHOD OF EXTRUDING THIN-WALLED HONEYCOMB STRUCTURES

CROSS-REFERENCE TO RELATED APPLICATION

This is a division of application Ser. No. 07/237,983 filed Aug. 29, 1988, now U.S. Pat. No. 5,066,215 issued Nov. 19, 1991.

BACKGROUND OF THE INVENTION

This invention relates to an extrusion die for forming thin-walled honeycomb structures from extrudable materials such as glass, glass-ceramics, ceramics, plastics, metals, cermets and other materials, especially those in particulate form, which are capable of being extruded through relatively small feed holes or channels whose length is several times their diameter or transverse dimension. The outlet ends of the feed holes communicate with grid forming discharge slots, these slots forming the cell walls of a honeycomb form extrudate. After the extrusion process, the honeycomb is treated to produce a rigid honeycomb structure as is known in this art.

Thin-walled honeycomb structures display utility in a variety of technologies. For example, thin-walled honeycomb structures fashioned from ceramic materials are used as catalyst carriers in catalytic converters in the exhaust system of internal combustion engines. They also are employed as radiators, catalyst carriers, filters, and heat exchangers.

The prior art is aware of a number of extrusion die constructions for forming thin-walled honeycomb structures, such as shown in U.S. Pat. Nos. 3,790,654 issued to Bagley, 3,824,196 issued to Benbow, 4,235,583 issued to Reed, and 4,354,820 issued to Yamamoto.

A significant drawback of certain prior art extrusion dies may be seen by reference to FIG. 1 of the Yamamoto patent and also to FIG. 1 of the patent to Reed. In both of these structures, the inlet portion of the die is provided with a plurality of cylindrical feed holes whose downstream ends terminate at the entrance or upstream portions of respective intersecting discharge slots, with alternate diagonal intersections of the discharge slots being directly fed by and aligned with the feed holes in the die.

Considering firstly Yamamoto, the material being extruded enters into the feed holes, each denoted by the numeral 2. The lower end of each of the feed holes is interrupted by tapered portions indicated by the numeral 20 in FIG. 3. Just after passing beyond the flow constricting, narrowing tapered portions 20, the extruded material flows into the outlet or discharge end of the die, for final extrusion through the discharge slots. There is thus an abrupt change in the cross-sectional area and shape of flow at the lower ends of the generally cylindrical feed holes, such change caused by the tapered portions 20. These portions 20 may be termed land or overhanging portions.

Turning now to Reed, a somewhat similar construction is shown wherein the exit portions of cylindrical feed holes 7 are abruptly narrowed down at the entrance to the discharge slots, the latter being denoted by the numeral 9.

From a consideration of FIG. 1 of either of the Yamamoto or Reed patents, it is seen that there are four overhanging, flow constricting land portions at the outlet end of each feed hole, this overhang resulting in an abrupt decrease in cross-sectional area of the feed holes. This overhang is defined by the corners of the entrance portions to the discharge slots which are in the flow path of the extruded material. Each such overhang (being four in number for orthogonally intersecting discharge slots) is thus subject to a bending moment due to the force of the extruded material abutting or flowing against each overhang.

Such die feed hole geometry places high bending forces on these overhanging or cantilevered portions of the die. In turn, this requires either the use of die materials having greater strength, or, limits the feed hole density of dies formed from materials having the greatest strength. Further, in the event that the material being extruded contains abrasive material, such overhanging portions are subject to greater wear and hence increased die degradation than if these portions were not present. These drawbacks are present in compound and laminated dies, as well as in unitary dies.

SUMMARY OF THE INVENTION

According to the practice of this invention, the abrupt change in cross-sectional area of the feed holes at their junctions with the discharge slots is avoided. Instead, there is a smooth and gradual transition of flow cross-sectional area and shape commencing at the entrance portion or end of the feed holes and terminating at the exit portion or end of the feed holes, where longitudinal and lateral flow through discharge slots commences. The cross sectional area at any location along the length of any feed hole (before it discharges into associated discharge slot portions) is less than at any location upstream thereof. This construction eliminates the noted high bending forces on the die and also substantially reduces abrasive wear.

Further according to the practice of this invention, there is provided an extrusion die having an inlet portion with feed holes and an outlet portion with intersecting discharge slots, at least one longitudinally extending feed hole extending from an inlet face of said inlet portion to an outlet end of said inlet portion, said at least one feed hole being tapered, to thereby yield a diminishing transition in cross sectional area and change in cross sectional shape from the input or inlet to the output or outlet end of said at least one tapered feed hole. Also according to this invention, there is provided a method of extruding a flowable material to form a structure, the method including the steps of (1) flowing said material longitudinally through a plurality of feed holes which are uniformly tapered throughout their length and both diminishing in transverse cross sectional area and changing in transverse cross sectional shape, and (2) then flowing the material into a plurality of interconnected discharge slots without contacting flow constricting land portions forming decreased cross sectional area of the holes at their outlet ends. The method may also include (3) delivering said material from said feed holes to portions of a primary grid of intersecting discharge slots of substantially uniform width, (4) delivering a portion of the flow of material from the primary grid to a secondary grid of interconnected discharge slots of substantially uniform width which is interdigitated with said primary grid, the slots of the secondary grid receiving said material both laterally from the slots of the primary grid and longitudinally from said feed holes, (5) longitudinally discharging said material from said primary and secondary discharge slots.

BRIEF DESCRIPTION OF THE DRAWINGS

FIG. 1 is a perspective view of a body or mass of material during its passage through a feed hole and associated discharge slot portions at any instant of time in a typical prior art extrusion die.

FIG. 2 is a similar view and illustrates the shape of the body or mass of material in a feed hole and associated discharge slot portions at any instant of time for a unitary die of this invention.

FIG. 3 is a longitudinal cross-sectional view of a portion of an extrusion die which forms the mass of FIG. 2.

FIG. 3A is a view taken along section 3A—3A of FIG. 3.

FIG. 3B is a view taken along section 3B—3B of FIG. 3.

FIG. 4 is a bottom plan view of the discharge slot at the exit face of the unitary extrusion die of FIG. 3.

FIG. 6 is a view similar to FIG. 2 and illustrates a modified shape of the entrance end of a feed hole.

FIG. 7 is a view illustrating the lower portions of five of the masses or bodies of FIG. 6.

FIG. 9 is a view of a feed hole mass similar to FIG. 2 and shows a modification wherein the entrance or inlet end of the feed hole is triangular and wherein the exit or outlet end is of a three pointed star shape. The die for producing this mass is the main die body for a die of the compound type, wherein a separate face or outlet plate (not shown) having discharge slots therein is fixed to the outlet end of the main or inlet portion of the die body.

FIG. 10 is a view showing several of the feed hole masses of FIG. 9 forming a hexagonal honeycomb extrusion.

FIG. 12 is a view similar to FIG. 2 and shows a feed hole mass wherein the entrance end of the feed hole is hexagonal and wherein the exit end is of a six pointed star shape. The portion die for producing this mass is the main or inlet portion of the die body for a die of the compound type, wherein a separate face or outlet plate (not shown) having discharge slots therein is fixed to the outlet end of the main portion of the die body.

FIG. 13 is a view showing several of the feed hole masses of FIG. 12 forming a triangular celled honeycomb shape prior to feeding to a face plate.

FIGS. 15, 16 and 17 are views similar to FIG. 2 and illustrate further modifications of a feed hole mass produced by feed holes of differing shapes. The die portion for producing these masses is the main die body portion for a die of the compound type, wherein a separate face plate (not shown) having discharge slots therein is fixed to the outlet end of the main die body portion.

FIG. 18 is a view illustrating the extrudant of the die of FIGS. 3 and 4.

FIG. 19 is a view showing several of the feed hole extrusion masses of FIG. 18 forming a fusion at their downstream or outlet portions.

DETAILED DESCRIPTION OF THE INVENTION

Figure 5:
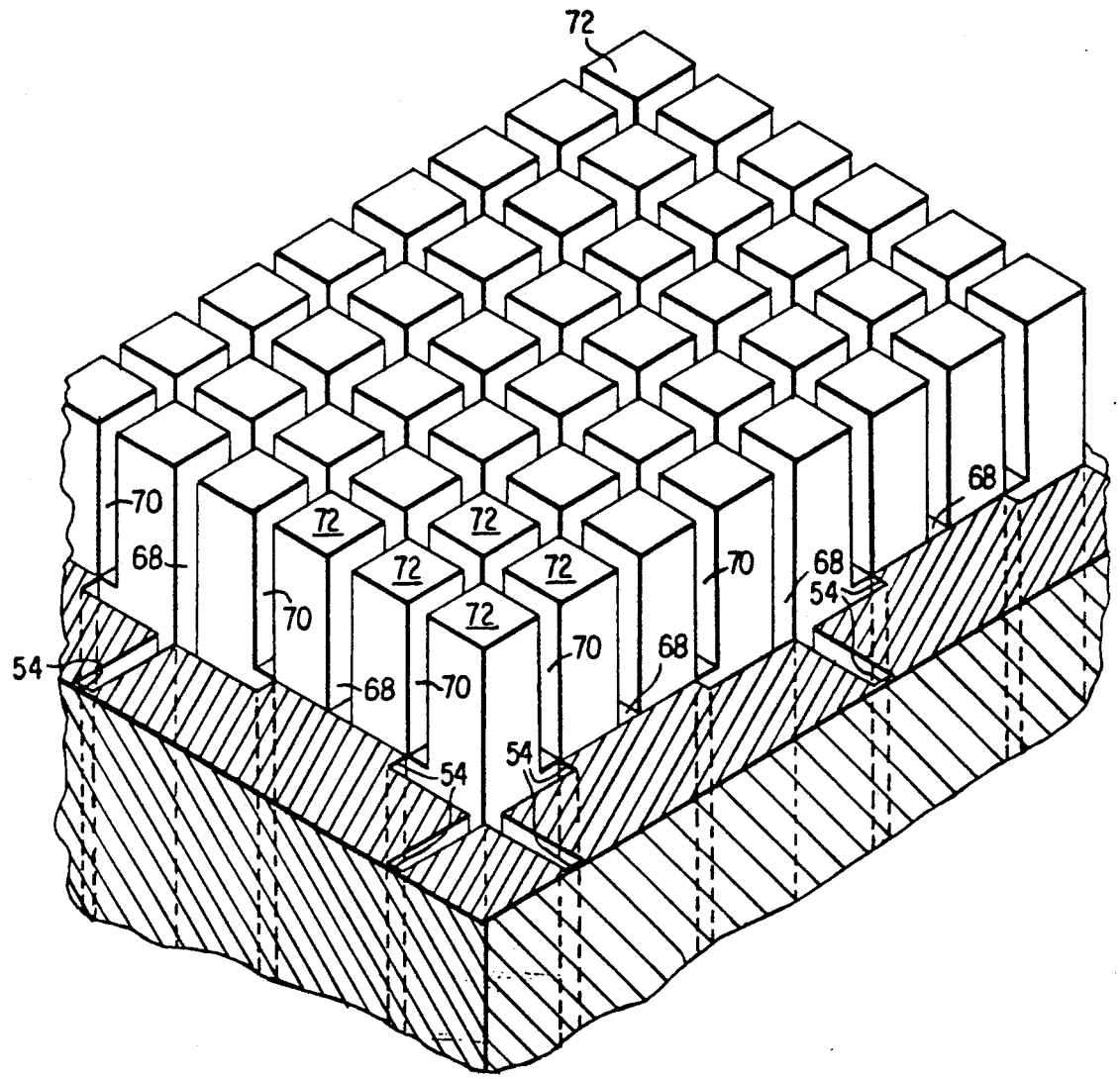
FIG. 5 is a partially broken perspective view of the outlet end of the die of FIG. 3.

Referring now to FIG. 1 of the drawings, the numeral 10 denotes a body or mass of material (such as a flowable ceramic) passing through a feed hole and discharge slot portion of a typical prior art die at any instant of time. This body of material is denoted by the numeral 10 and may be imagined as how the material would appear if the die portions immediately surrounding and defining this particular feed hole and its associated discharge slot portions were suddenly removed, leaving only the material, and before this flowable material collapsed. The numeral 14 denotes that portion of the flowable material in the uniform diameter feed hole. The numeral 16 denotes any of four radially inwardly directed portions, these portions 16 being complementary to overhanging portions 20 of the noted Yamamoto patent. The numeral 18 denotes any one of four generally rectangular fin or leg portions of this flowable material, these portions terminating at the lower portion or outlet end of the discharge slots of the die and whose lower faces are denoted by the numeral 20. There is thus an abrupt change in both transverse cross sectional shape and in cross sectional area at the junction of the feed hole and the discharge slots.

Referring now to FIG. 2 of the drawings, a corresponding body or mass of the flowable material passing through a die feed hole and associated discharge slot portions of the present invention at any instant of time is shown and is denoted by the numeral 30. The inlet end of this feed hole mass is denoted by the numeral 32, and its transverse cross sectional inlet end is essentially square, having truncated corners 34 which define edges 36 of fins or legs 38. The flowing mass smoothly changes in cross sectional shape from essentially square at entrance 32 to cross-shaped at its outlet or discharge end where it meets the (congruent) entrances of associated discharge slot portions. The outlet end transverse cross sectional plane of each leg of the cross shaped extrudate is denoted by the numeral 40. The numeral 42 denotes the lowermost portion of one of four progressively deepening grooves in the body 30. With increasing distance from the input entrance transverse cross sectional plane 32, the four progressively deepening grooves are formed or developed along the feed hole. Both the transverse cross sectional area and shape change along the length of mass 30, except in the downstream zone between 56 and 40. In this downstream, axial zone, defined by discharge slot portions, the area and shape of the extruded mass both remain constant and the depth of grooves 42 also remains the same. The numeral 56 thus represents the commencement of the wall of the honeycomb as defined by the discharge slots of a unitary die, the discharge slots being of constant width.

Referring now to FIG. 3 of the drawings, the numeral 50 denotes a die formed in accordance with one embodiment of this invention having an inlet portion 55 and includes a plurality of longitudinally extending feed holes 51 each of whose inlet portions or ends 52 corresponds to the inlet plane 32 of FIG. 2. The inlet face 53 of the die is an inlet or upstream face, with the discharge or outlet face 60 having the usual outlet or downstream discharge slots. Each feed hole 51 produces the mass shown at FIG. 2.

The numeral 54 represents elongated, narrow flat surfaces in each of the feed holes 51 which form and correspond to the flat edges 36 of fins 38 shown at FIG. 2. The width of flat surfaces 54 is the same as the width of edges 36. The numeral 44 denotes any of the four edges between meeting or intersecting surfaces 41 in each feed hole 51, die surfaces 41 forming the side surfaces of fins 38. Each edge 44 forms a respective lowermost groove portion 42 of the mass shown at FIG. 2. Each feed hole 51, except at its upper edge, thus has eight surfaces 41, angularly arranged in pairs, with each pair of surfaces intersecting to form its own edge 44. The eight surfaces 41 form the eight side surfaces of the four fins 38. Each edge 44 extends radially inwardly of its respective feed hole, from opposite sides thereof, the radial extent being zero at the top or upstream end of a feed hole, to a maximum at the junction 58 between inlet portion 55 and outlet portion 66, at which junction the outlet ends of the holes 51 open into the beginning or inlet ends of the discharge slots 68, 73. This structure is further illustrated at FIGS. 3A and 3B, these representing axially spaced cross sections of any feed hole 51. A change in slope of edges 44 occurs at zones junction 58, the slope changing to vertical there and defining the entrance of the discharge slots, soon to be described.

The numeral 66 denotes generally the outlet or discharge zone, portion or plate of extrusion die 50 with an inlet end at junction 58, and is provided with a plurality of orthogonally intersecting or criss crossing discharge slots 68 and 70, also shown at FIG. 4, extending to outlet end or face 60 of the die. The discharge portion 66 may be integral with die body 50, or alternatively, may be separate, as in the case of a compound die. Except for the fastening means (well known in this art) for affixing such a separate plate 66 to the downstream portion of the die, FIG. 3 can also be considered as a cross section of a compound die. Diagonally alternate intersections of the discharge slots 68 are each aligned with the central portion of each feed hole 51. There is a desirable overlap between the inner end of holes 51 into the inner ends of slots 68 somewhat below junction or zone 58 as shown in FIG. 3. This relationship is analogous to that feature disclosed and shown in FIG. 2 of U.S. Pat. No. 3,790,654, herein incorporated by reference. The dashed lines 32, 52 indicate a typical feed hole entrance. As shown at both FIGS. 3 and 4, the discharge slots include portions 70 which are more remote from those slot intersections aligned with a feed hole 51. Each of the four crossed legs of the extruded material, indicated at FIG. 2, extends along a corresponding one of the four intersecting portions of discharge slots 68, also as indicated in FIG. 4. Slot portions 68 which are within the dashed outlines of feed holes 51 of FIG. 4 are longitudinally fed (aligned with a feed hole), while most of discharge slots 70 (not aligned with a feed hole) are laterally fed. Only at regions 73 of slots 70 are the latter longitudinally fed.

Slots 68 are termed primary discharge slots while slots 70 are termed secondary discharge slots. Slots 68 form a primary grid while slots 70 form a secondary grid, these grids being interdigitated. Some of the intersections of slots 68 are longitudinally fed by a respective feed hole 51, while no intersection of slots 70 is longitudinally fed by a feed hole 51.

Zones 56 at FIG. 2 correspond to and are formed by die zones 58 of FIG. 3. In practice, the fins 38 of FIG. 2 commence to spread or flow laterally (radially outwardly) downstream of zones 56 to knit with other laterally flowing extrudate portions from adjacent discharge slot portions 68, 70. This lateral flow cannot, however, be accurately depicted and hence is not shown at all. The same is true for fins 18 of FIG. 1.

As shown at FIGS. 4 and 5, the discharge slots 68 and 70 orthogonally intersect each other to define pins, cores or lands 72. As indicated at FIG. 4, the radially outermost portion of each discharge leg 40 of mass 30 of FIG. 2 extends a radial distance greater than the side dimension of pins 72. This radial extent of the legs 40 results in a portions 73 of slots 70 being longitudinally fed from the feed holes 51. As may be seen from FIGS. 2 to 4, all portions of discharge slots 68 which are within the dashed line outlines 32, 52 are longitudinally fed from a respective feed hole 51. The invention is not limited by this specific arrangement. For example, the extreme tip to tip distance of diametrically opposite lower fin portions 38 of FIG. 2 can be smaller, relative to any vertically or horizontally running pair of slots 70, so that all portions of slots 70 are only laterally fed.

The formation of the feed holes 51, and also of the primary and secondary discharge slots in die 50 is preferably carried out by a method known as electrical discharge machining, often designated by the acronym EDM. This method or technique is well known, as may be seen by reference to U.S. Pat. Nos. 3,731,043 issued to Ullman et al; 4,403,131 issued to Cunningham et al; 4,350,865 issued to Bachrach; 3,851,135 issued to Moracz et al; 4,431,896 issued to Lodetti, and 4,485,287 issued to Hamasaki et al.

In one method, the edges 44 of feed holes 51 are initially formed with a uniform taper from the inlet to the outlet face of the die body 50 by EDM, with the spacing between the lowermost adjacent edges 44 being less than the width of flat portions 54 of any feed hole, this latter width being the width of the discharge slots. Then, the taper of edges 44 at the lowermost portion of each feed hole is automatically removed upon the formation of the discharge slots 68 and 70. This loss of taper of edges 44 at the downstream or outlet ends of the feed holes commences at regions 58 as is seen in FIG. 3, and, as noted above, generates portions 56 of FIG. 2.

The discharge slots are also formed by EDM, although other methods such as milling and sawing can be employed.

In the case of a compound die having a separate plate 66 with its own uniform width discharge slots, the taper of edges 44 in each feed hole 51 would be uniform from the main die portion inlet face to its outlet face at junction 58 where it contacts the inlet of the face plate.

In the embodiment illustrated at FIGS. 2-4, the width of the discharge slots is the same as the width of flats 54 of any feed hole. The invention is not limited by this relation, however. For example, the inlet shape of the feed hole may be that of a regular or equal sided octagon. Each alternate side of such a feed hole is provided with a uniformly tapering edge 44 (similar to that of FIGS. 3, 3A, 3B), with the remaining four flat interior feed hole portions uniformly narrowing towards the outlet end 60 of the die. At regions corresponding to 54 of FIG. 3, the width of these flat portions is the same as the width of the discharge slots.

Referring now to FIG. 5, the top of the hatched outer regions of the die corresponds to zones 58 of FIG. 3, where discharge slots 70 commence and where taper of the feed holes ceases.

Referring now to FIG. 6 of the drawings, a mass passing through a modified shape die feed hole and modified die is illustrated. The numeral 80 denotes the mass of material, with the numeral 82 designating to its top surface, located at the die entrance or inlet face, and the numeral 84 denotes any one of four inwardly curved sides. The entrance end thus corresponds to the entrance end shown in FIG. 2, except that each of the four longest legs of the polygonal upper end is curved instead of straight. The mass shape is otherwise the same as that of FIG. 2 and the same reference numerals for the remainder of the body are employed.

FIG. 7 is a view similar to FIG. 6 and illustrates several of the masses of extrudate material of FIG. 6. The downstream ends of the masses pass through the die feed holes and the tips of legs 40 fuse laterally together to form the closed cells of the honeycomb extrudate. The downstream end of the extrudate material mass also carries laterally extending legs 380 having terminal or downstream surface portions 400. Legs 380, which also become walls of the honeycomb extrudate, are formed from those discharge slot portions 68 of a die, similar to that of FIGS. 3 and 4, which are not directly aligned (being laterally fed) with a feed hole 51.

Figure 8:
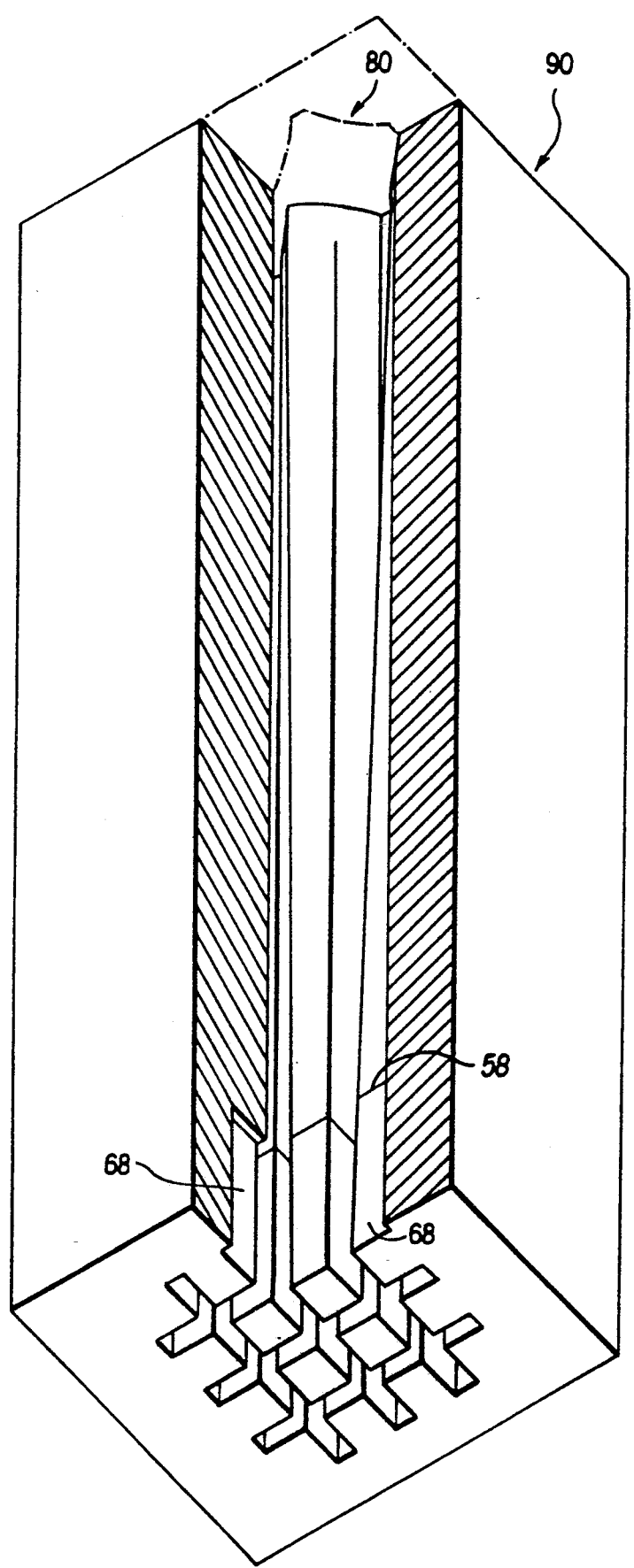
FIG. 8 is a partially broken view of a unitary die which forms the masses of FIG. 7, the die being of a modified construction.

FIG. 8 illustrates a unitary die which yields the masses of FIG. 7. This die, as well as the others described, is not of full size regarding the number of feed holes therein for industrial production of honeycomb extrudates. In FIG. 8, the numeral 90 denotes a die having a plurality of feed holes, similar to feed holes 51 of FIG. 3. As with the embodiment of FIG. 3, the numeral 68 denotes intersecting discharge slots. There are no slots such as 70 of FIGS. 3 and 4, however. The numeral 58 again denotes the end of the taper of the feed holes and the beginning of the discharge slots.

Referring now to FIG. 9 of the drawings, the numeral 94 denotes a feed hole mass produced by a modified feed hole shape and having a triangular entrance or upstream portion 96 and three leg portions 98, each having radially outermost edges 100, the latter terminating at three surface portions 102 to define a three pointed star. This mass continuously tapers and hence does not have zones 56 such as in FIG. 2. These zones 56 are, however, indicated to show that the die for producing mass 94 is the upstream or main die and that the lower edges of legs 98 enter the upstream end of a portion or plate 66.

FIG. 10 illustrates several of the masses of FIG. 9 forming a hexagonal celled honeycomb extrudate. The terminal radially outermost portions of legs 98 flow laterally during passage through the die feed holes and fuse to form a plurality of walls 106, these walls 106 defining hexagonal closed cells. The initial knitting of terminal parts of legs 98 of adjacent masses is denoted by 105. This illustrates that lateral knitting can occur upstream of the discharge slots.

Figure 11:
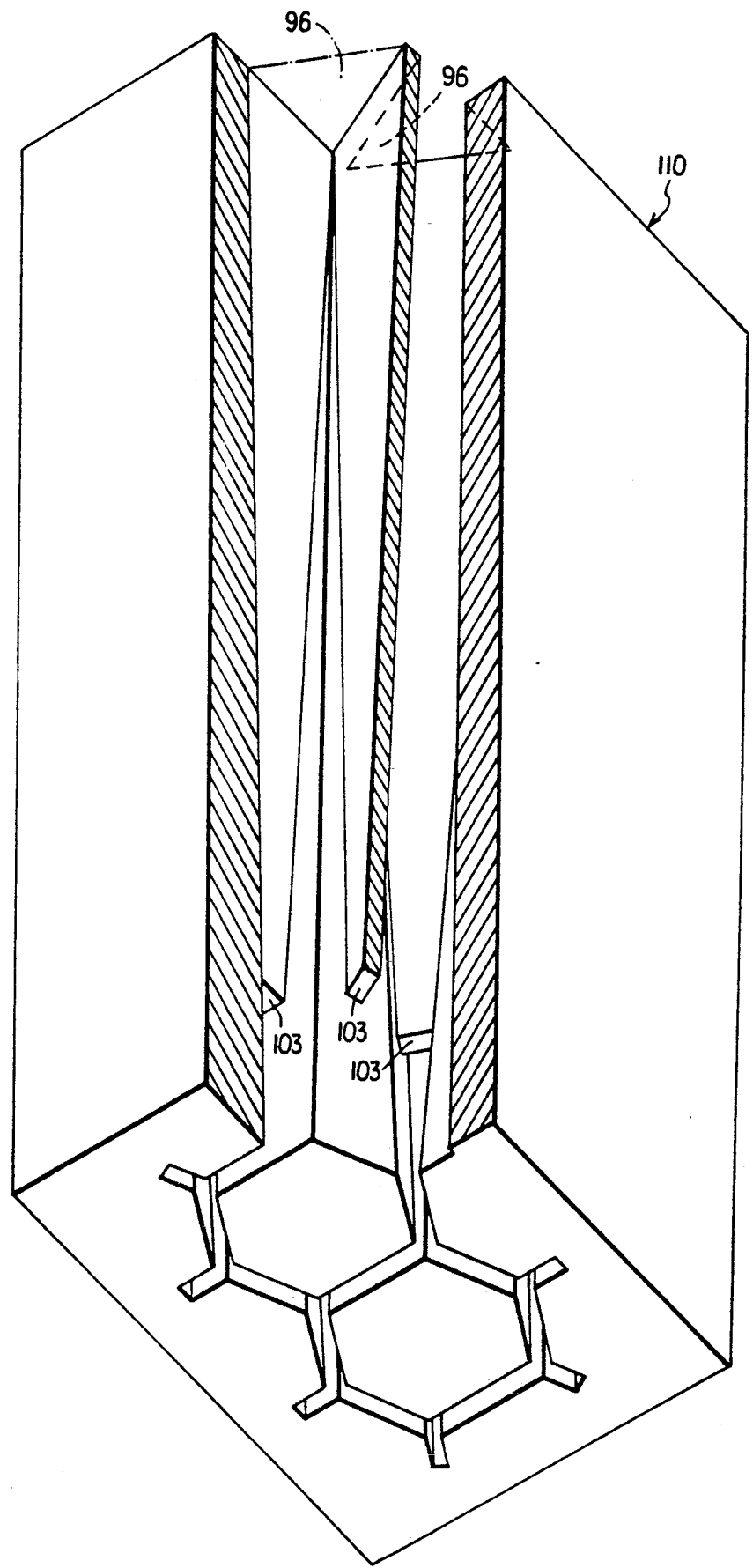
FIG. 11 is a partially broken view of a die which forms the feed hole masses of FIG. 10.

FIG. 11 illustrates a unitary die 110 for forming the extrudate of FIG. 10. The numeral 103 denotes the lower edge of those walls within the die which separate the several feed hole fin forming cavities from each other. This separation ceases near the upper die portion outlet face, to permit the knitting of the individual fins or legs which commences at regions 105 as shown at FIG. 10.

Referring now to FIG. 12 of the drawings, the numeral 112 denotes a feed hole mass having a generally hexagonal shape 114 at its entrance and formed by a modified shape feed hole. Numeral 116 denotes a radially outermost portion of a respective leg 118, portion 116 tapering as indicated, with a plurality of legs 118 terminating at surfaces 120 at the lower end of the mass. The numeral 56 again represents the termination in taper of the fins at the entrance to the discharge slots of a portion plate 66.

FIG. 13 illustrates several of the masses of FIG. 12 forming a triangular celled honeycomb shape prior to entering the discharge slots of a face plate. Upon passing through the die, the lowermost portion of legs or fins 118 flow laterally and fuse to thereby define triangular cells each defined and bounded by three continuous walls 122. The initial lateral knitting of legs 118 taking place at zones 121, the latter located immediately beneath (downstream) ends 133 of the die of FIG. 14.

Figure 14:
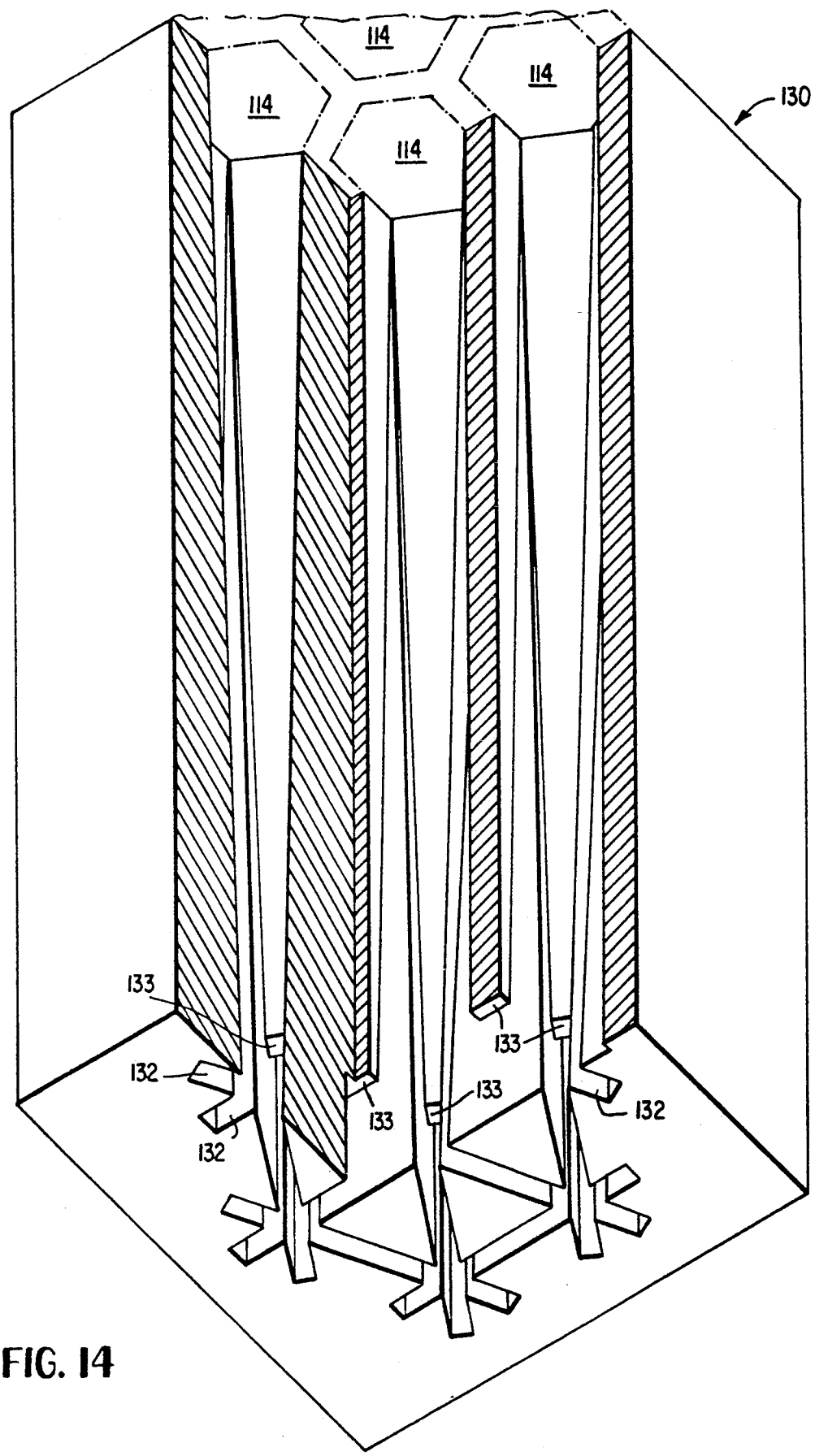
FIG. 14 is a partially broken view of a die which forms the feed hole masses of FIG. 13.

FIG. 14 illustrates a unitary die for producing the extrudate of FIG. 13. The numeral 130 denotes the die, the die having a plurality of substantially parallel feed holes, similar to feed holes 51 of FIG. 3. Each feed hole includes a plurality of slots 132. The numeral 133 (corresponding to 103 of FIG. 11) denotes the lower edge of those inter feed hole walls within the die which separate the feed holes. These edges form zones 121 of FIG. 13.

Referring now to FIG. 15, another variant of a mass being extruded, similar to that of FIG. 9, is illustrated and is denoted by the numeral 140. The entrance end at the die input face is square with each side 142 tapering, as grooves are developed, to define fins or legs 144. The lowermost portion of the feed hole mass is denoted as 146. Again, numeral 42 denotes a line of junction between intersecting surfaces of the ribs or legs 144. The numeral 56 (as in FIGS. 16 and 17 to be described) again indicates the lowermost mass portion as feeding into discharge slots of a portion or plate 66.

In FIG. 16, the numeral 150 denotes yet another variant of a feed hole mass, here having a triangular entrance end shape and a three legged star form at its lower end. Fins 152 carry edges 154 and terminate in lower surfaces 156.

Referring now to FIG. 17, the numeral 160 denotes a feed hole mass with the upper end of the mass being substantially hexagonal, with the corners of the meeting hexagonal sides being replaced by chords 34 of relatively short extent, to define an edge 36 of uniform width throughout the length of the mass. Radially disposed fins 162 terminate at surfaces 164 to define a generally six pointed star shape. As in FIG. 16, the numeral 42 denotes a line of juncture or meeting between intersecting surfaces of adjacent fins.

FIG. 18 is a view similar to FIG. 2 and illustrates a single mass in a feed hole, such as a feed hole 51 of FIG. 3, and further illustrates the formation of additional cell wall members produced by slots 70 shown in FIG. 3. In FIG. 18, the numeral 170 denotes the mass of material in the feed hole, with numeral 172 denoting a shape of the inlet of the feed hole, this shape being similar to that illustrated at FIG. 6. The numeral 34 denotes the edges of respective legs 174, the latter defined by a smooth transition from the entrance towards the downstream or lower portion of the mass. Again, the numeral 42 denotes a line of juncture between adjacent walls of legs 174. The mass of material being extruded by discharge slots 70 is denoted by the numeral 184.

Referring now to FIG. 19, several of the masses of FIG. 18 are illustrated, with their lower portions fusing together to form a honeycomb structure. The numeral 184 again denotes those extrudate portions formed by slots 70 shown at FIG. 3. The numeral 184a denotes that portion of the mass in the discharge slots formed by those discharge slots 68 which are directly fed (longitudinally fed, i.e., aligned with a feed hole 51). A typical cell wall portion of the final extrudate is formed by the lower portion of legs or fins 174, these being directly fed from a feed hole to a discharge slot portion. The next lateral wall portions 184, measured from the continuation of legs 174, arise by virtue of the slots 70 of FIG. 3. Next to a mass portion 184 is a portion 184a, corresponding to laterally fed slots 68 of FIG. 3. Next to that is another mass portion 184 corresponding to a slot 70, and again a wall portion from leg or fin 174 which is directly fed from a feed hole.

Comparing FIG. 19 with FIG. 7, FIG. 7 has portions 380 which correspond to laterally fed slots 68, but has no portions corresponding to the slots 70, the latter being absent. On the other hand, FIG. 19 shows honeycomb wall portions which arise from each of the directly (longitudinally) fed discharge slots, the discharge slots 68 which are laterally fed, and also the discharge slots 70.

Figure 20:
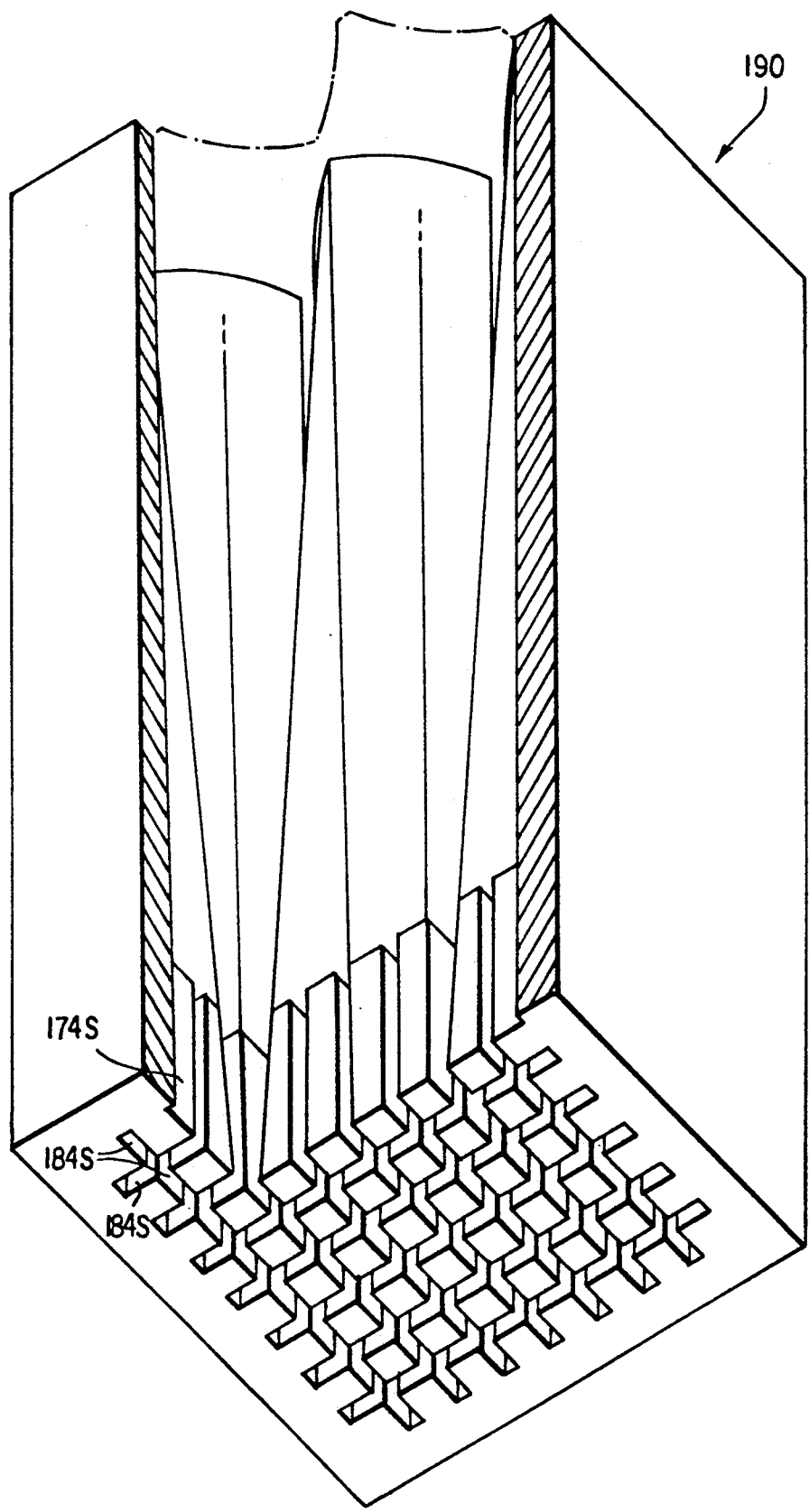
FIG. 20 is a partially broken view of a die for producing the feed hole extrusion shape shown at FIG. 19.

Referring now to FIG. 20 of the drawings, the numeral 190 denotes a die having a feed hole and primary and secondary discharge slot arrangement for yielding the masses illustrated at FIG. 19. In FIG. 20, the numeral 174S denotes a portion of a directly fed primary discharge slot, i.e., one receiving the lower portion of a leg or fin 174 of FIG. 19. The numerals 184S denote discharge slots which yield the mass portions 184 of FIG. 19.

The inclusion of secondary discharge slots such as 70 of FIG. 3 is optional as is the use of the indirectly fed primary discharge slots 68 of FIG. 3. Thus, one may practice this invention by having the outlet or lower portion of each feed hole feed every interception of the grid defined by the primary discharge slots 68.

The invention has been described as being carried out with either a unitary or one piece die, with a compound or composite die, or with a laminate die. The same advantages with either are enjoyed, namely, the lack of any shoulders in the path of the material being fed through the feed holes into the discharge slots, whether the latter are integral with or separate yet aligned with the feed holes.

While presenting somewhat greater manufacturing difficulties, the feed holes 51 may be formed so that their upper portions (not including the discharge slots) diverge from each other, with the feed holes being either straight or curved. In such a construction, the area of the inlet face of the die would be greater than the area of the discharge face, to accommodate the divergence. Such a variation may be practiced with either a unitary die, a compound die, or a laminate die. Further, the taper of the feed holes 51 has been shown as linear. This is not essential to enjoy the noted smooth transition, the feed holes may be curved so that the maximum diameter of the entrance end of each feed hole is greater than that of the outlet end. In FIG. 2, these diameters are equal, the change in cross sectional shape alone yielding compression of the flowable material.

As is conventional in the extrusion die art, the die feed holes and discharge slots are coated prior to initial use. Often, all surfaces of the die are coated. Such coating compositions and die coating techniques are known in this art, as may be seen by reference to U.S. Pat. Nos. 4,235,583 issued to Reed and 4,574,459 issued to Peters.

What is claimed is:

1. A method of extruding a flowable material to form a thin-walled honeycomb structure,
    the method comprising the steps of (1) flowing the material into and through a plurality of feed holes with their inlet ends at the inlet face of a die to outlet ends of the holes at a junction between the outlet ends of the holes and the inlet ends of a plurality of intersecting and laterally criss crossing discharge slots longitudinally extending from their inlet ends to outlet ends of the slots in the die, the outlet ends of the holes being aligned at the junction with intersections of slots at their inlet ends, and (2) flowing the material from the outlet ends of the holes into and through the slots and thence out of the outlet ends of the slots at the outlet face of the die in the form of the structure,
    characterized by the improvement comprising (3) flowing the material through the plurality of feed holes which are uniformly tapered throughout their length and both diminishing in transverse cross sectional area and changing in transverse cross sectional shape along their length in a smooth and gradual transition from the inlet ends of the holes to the outlet ends of the holes, and (4) flowing the material from the outlet ends of the holes at the junction into the slots without contacting flow constricting land portions forming decreased cross sectional area of the holes at their outlet ends.

2. The method of claim 1 further characterized by (5) delivering the material from the feed holes to portions of a primary grid of the slots including the intersections of the slots aligned with the holes, the slots of the primary grid being of substantially uniform width, (6) delivering a portion of the material laterally from the primary grid and a portion of the material longitudinally from a transverse peripheral part of the outlet end of the holes to a secondary grid of the slots which is interdigitated with the primary grid, the slots of the secondary grid being of substantially uniform width, and (7) longitudinally discharging the material from the primary and secondary grids of slots at the outlet face in the form of the structure.

3. The method of claim 1 further characterized by the flowable material being a ceramic material.

4. The method of claim 2 further characterized by the flowable material being a ceramic material.

5. The method of claim 1 wherein the flowing of step (4) is from the outlet ends of the holes into the inlet ends of the slots at the junction where the transverse cross sectional area and shape of the outlet end of each hole is the same as the transverse cross sectional area and shape of the portion of the inlet end of the slot into which that outlet end of the hole directly feeds at the junction.

6. The method of claim 5 further characterized by the flowable material being a ceramic material.

* * * * *